United States Patent
Venturino et al.

(10) Patent No.: US 7,265,786 B2
(45) Date of Patent: Sep. 4, 2007

(54) DISPLAY OVERLAY CONTAINING SPATIALLY-DISTRIBUTED MENU OPTIONS FOR A DIGITAL CAMERA USER INTERFACE

(75) Inventors: Michael Venturino, Geneseo, NY (US); James E. Mcgarvey, Hamlin, NY (US)

(73) Assignee: Eastman Kodak Company, Rochester, NY (US)

( * ) Notice: Subject to any disclaimer, the term of this patent is extended or adjusted under 35 U.S.C. 154(b) by 699 days.

(21) Appl. No.: 10/242,994

(22) Filed: Sep. 13, 2002

(65) Prior Publication Data

US 2004/0051803 A1 Mar. 18, 2004

(51) Int. Cl.
*H04N 5/222* (2006.01)
(52) U.S. Cl. .................................. 348/333.02
(58) Field of Classification Search ............ 348/333.02
See application file for complete search history.

(56) References Cited

U.S. PATENT DOCUMENTS

| 4,827,341 | A | | 5/1989 | Akimoto et al. |
| 5,164,831 | A | | 11/1992 | Kuchta et al. |
| 6,154,210 | A | * | 11/2000 | Anderson .................... 715/840 |
| 6,249,316 | B1 | | 6/2001 | Anderson |
| 6,313,877 | B1 | | 11/2001 | Anderson |
| 6,549,304 | B1 | * | 4/2003 | Dow et al. ................... 358/473 |
| 6,829,009 | B2 | * | 12/2004 | Sugimoto .............. 348/333.02 |
| 7,061,535 | B2 | * | 6/2006 | Misawa et al. .............. 348/375 |
| 2001/0048425 | A1 | * | 12/2001 | Partridge ..................... 345/161 |
| 2002/0024604 | A1 | | 2/2002 | Ejima et al. |
| 2002/0030754 | A1 | | 3/2002 | Sugimoto |
| 2002/0057351 | A1 | | 5/2002 | Suzuki et al. |

FOREIGN PATENT DOCUMENTS

JP 11146308 A * 5/1999

* cited by examiner

*Primary Examiner*—Ngoc-Yen Vu
*Assistant Examiner*—Adam L. Henderson
(74) *Attorney, Agent, or Firm*—Thomas J. Strouse

(57) ABSTRACT

A digital camera which captures digital images comprising: a display for displaying an image(s) captured by the digital camera; a user actuatable switch assembly having a plurality of spatially arrayed actuatable positions; and means for displaying a menu overlay over an image(s) displayed on the display, wherein the menu overlay displays selectable options spatially arrayed in the same pattern as the plurality of spatially arrayed actuatable positions, such that actuation of the switch at one of the plurality of positions selects the option displayed at a like position of the menu overlay.

7 Claims, 8 Drawing Sheets

```
Press ↕ or ←→ to choose
desired option.
```
~ 82
FIG. 10
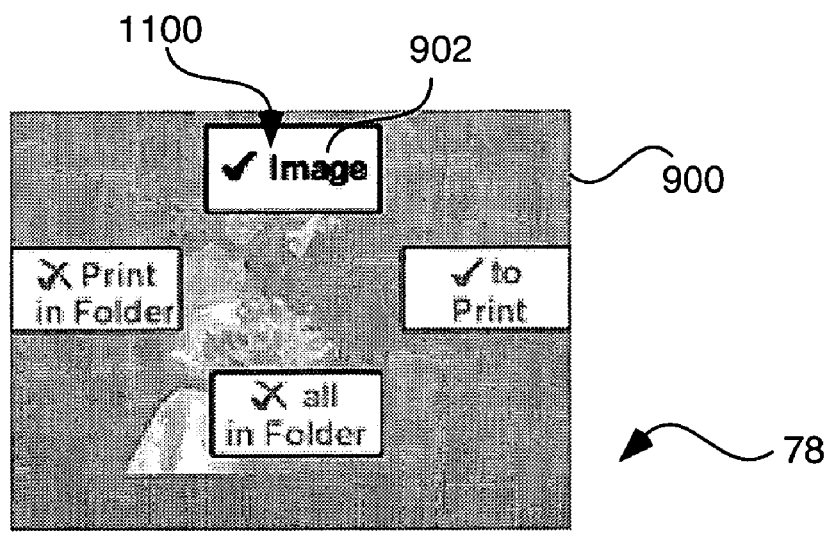
FIG. 11
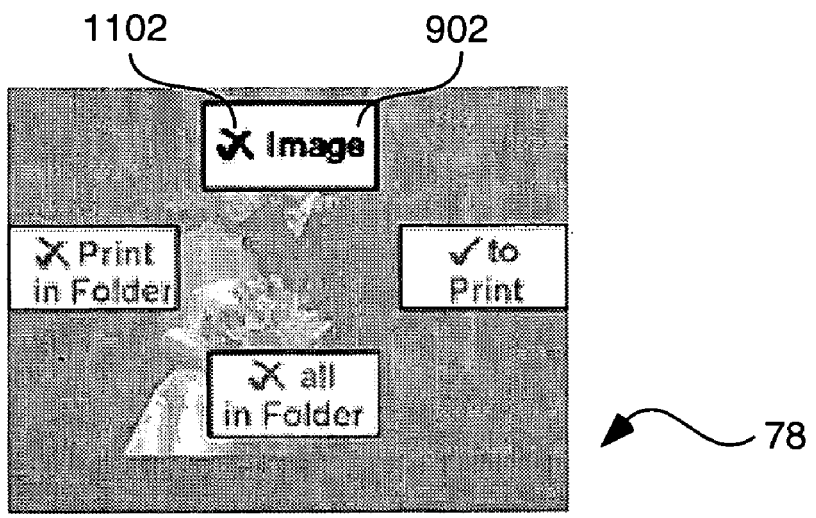
FIG. 12

DISPLAY OVERLAY CONTAINING SPATIALLY-DISTRIBUTED MENU OPTIONS FOR A DIGITAL CAMERA USER INTERFACE

FIELD OF THE INVENTION

This invention relates in general to a digital camera, and more particularly to a digital camera having an image display wherein camera features and functions are displayed as an overlay over a displayed image.

BACKGROUND OF THE INVENTION

Handheld digital information/imaging systems, such as digital cameras, cell phones, personal digital assistants, etc. have become widespread in use in recent years. In order to present images and systems information to a system user, the system is usually provided with at least one display for displaying images and/or information useful to the user. User interface switches are also usually provided to navigate among items displayed on the display. In digital cameras, it is typical to have a large LCD (Liquid Crystal Display) display for displaying an image or images captured by the digital camera. The display can also display image capture related functions and menus of camera features that are user selectable (See: U.S. Patent Application Publication U.S. 2002/0030754 A1, published Mar. 14, 2002, inventor Sugimoto; U.S. Patent Application Publication U.S. 2002/0024604 A1, published Feb. 28, 2002, inventors Fjima et al.; U.S. Patent Application Publication U.S. 2002/0057351 A1, published May 16, 2002, inventors Suzuki et al.; U.S. Pat. No. 6,313,877 B1, issued Nov. 6, 2001, inventor Anderson). It is also known to provide a tagging feature which allows the camera user to tag a displayed image for further processing, printing, display, etc. (See: U.S. Pat. No. 6,249,316 B1, issued Jun. 19, 2001, inventor Anderson and U.S. Pat. No. 4,827,341, issued May 2, 1989, inventor Akimoto).

It would be desirable to provide a user interface that allows a user to quickly access tag and other features and to facilitate access by user intuitive means.

SUMMARY OF THE INVENTION

According to the present invention, there is provided a solution to the problems and fulfillment of the needs set forth above.

According to a feature of the present invention, there is provided a digital camera which captures digital images comprising:

a display for displaying an image(s) captured by said digital camera;

a user actuatable switch assembly having a plurality of spatially arrayed actuatable positions; and means for displaying a menu overlay over an image(s) displayed on said display, wherein said menu overlay displays selectable options spatially arrayed in the same pattern as said plurality of spatially arrayed actuatable positions, such that actuation of said switch at one of said plurality of positions selects the option displayed at a like position of said menu overlay.

ADVANTAGEOUS EFFECT OF THE INVENTION

The invention has the following advantages.

1. A digital camera has a digital user interface that allows quick access to a camera's features and functions and facilitates access by user intuitive means.

2. A digital camera has an image display for displaying an image, a user interface which effects an overlay of the image, the overlay having spatially presented options which mimic the spatially located switches of a user interface.

BRIEF DESCRIPTION OF THE DRAWINGS

FIGS. 3-16 are diagrammatic views useful in explaining the present invention.

DETAILED DESCRIPTION OF THE INVENTION

Although in the following description, the present invention will be described incorporated into a digital camera, it will be understood that the invention is also applicable to other hand held or portable digital information/imaging systems such as cell phones, personal digital assistants, portable computers and the like.

Figure 1:
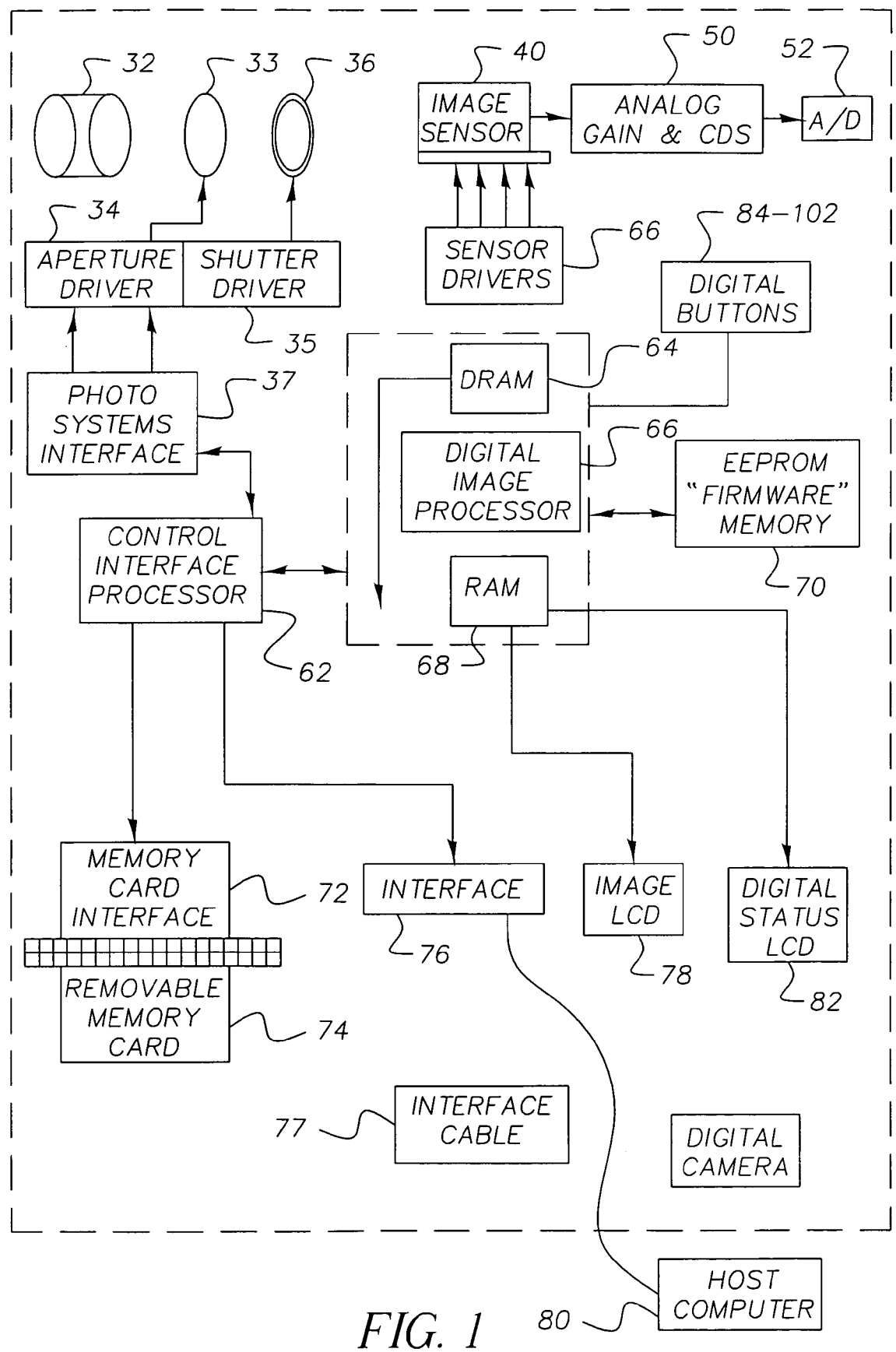
FIG. 1 is a block diagram of an exemplary digital camera incorporating the present invention.

FIG. 1 is a block diagram of an exemplary digital camera which implements the method and incorporates the apparatus of the present invention. The digital camera 30 produces digital images that are stored on the removable memory card 74. The digital camera 30 includes a lens 32, an electrically adjustable aperture 33 driven by aperture motor drive 34 and an electrically driven mechanical shutter 36 driven by shutter motor drive 35. The lens 32 focuses light from a scene (not shown) on an image sensor 40, for example, a single-chip color CCD image sensor, suing the well known Bayer color filter pattern. The image sensor 40 are controlled by sensor driver 42. The aperture motor 34 and shutter motor 35 and the sensor driver 42 are controlled by control signals supplied by a control interface processor 62 and photo systems interface 37.

The control interface processor 62 receives inputs from the Photo Systems Interface 37. The analog output signal from the image sensor 40 is amplified and converted to digital data by the analog signal processing (ASP) 50 and analog-to-digital (A/D) converter circuit 52. The ASP 50 and A/D 52 includes a programmable electrical gain that can be used to adjust the effective ISO speed setting of the camera. This can be done as described in commonly-assigned U.S. Pat. No. 5,610,654, issued Mar. 11, 1997, inventors Parulski et al. The digital data is stored in a DRAM buffer memory 64 and subsequently processed by a digital image processor 66 controlled by the firmware stored in the firmware memory 70, which can be flash EPROM memory. Alternatively, the digital image processor 66 can be provided by custom circuitry (e.g., by one or more custom integrated circuits [ICs] design only for use in digital cameras), or by a combination of programmable processor(s) and custom circuits.

The processed digital image file is provided to a memory card interface 72 which stores the digital image file on the removable memory card 74. Removable memory cards 74 are known to those skilled in the art. For example, the removable memory card 74 can include memory cards adapted to the PCMCIA card interface standard, as described in the PC Card Standard, Release 2.0, published by the Personal Computer Memory Card International Association (PCMCIA), Sunnyvale, Calif., September 1991, or to the *CompactFlash Specification Version* 1.3, published by the CompactFlash Association, Palo Alto, Calif., Aug. 5, 1998. Other types of removable memory cards, including Smart Memory cards, Secure Digital (SD) cards, and Memory Stick cards, or other types of digital memory devices, such as magnetic hard drives, magnetic tape, or optical disks, could alternatively be used to store the digital images.

In some embodiments, the digital image processor 66 performs color interpolation followed by color and tone correction, in order to produce rendered sRGB image data. The rendered sRGB image data is then JPEG compressed and stored as a JPEG image file on the removable memory card 74. In other embodiments, the processor directly compressed data on the removable memory card 74, and the image is later "finished" by processing the compressed Bayer color image data using the host PC 80.

The processor 66 also creates a "thumbnail" size image that is stored in RAM memory 68 and supplied to the color image LCD 78, which displays the captured image for the user to review. A digital status dot matrix LCD 82 is also provided. The mutual display support between LCDs 78 and 82 is described in more detail later. Instead of a color LCD image display, the digital camera 30 could use an organic light emitting diode (OLED) display, or many other types of image displays. The thumbnail image can be created as described in commonly-assigned U.S. Pat. No. 5,164,831, issued Nov. 17, 1992, inventors Kuchta et al., the disclosure of which is herein incorporated by reference. The graphical user interface displayed on the color LCD image display 78 and on the digital status LCD 82 is controlled by the user interface portion of the firmware stored in the firmware memory 70 and by digital buttons 84-100. A third display (not shown) can be provided on the top of the camera 10 to show camera body settings such as aperture, shutter speed, exposure mode, etc.

After a series of images have been taken and stored on the removable memory card 74, the removable memory card 74 can be inserted into a card reader (not shown) in host PC 80. Alternatively, an interface cable 77 can be used to connect between the interface 76 in the digital camera 30 and the host PC 80. The interface cable 77 can conform to, for example, that well known IEEE 1394 interface specification, the universal serial bus (USB) interface specification, or other wired or wireless interface specifications.

Alternatively, the digital camera 30 could be comprised of a digital back for a 35 mm or medium format film camera. In this case, the lens 32, aperture 34, shutter 36 are provided as part of the film camera body, and the other components, including the image sensor 40, image processor 66 and color LCD image display 78, are provided as part of a separate digital camera back that is connected to the film camera body. The connection preferably includes an electrical connector (not shown), so that the lens 32, aperture 33, and shutter 36 can be controlled by the control processor and timing generator 60 in the digital back.

Figure 2:
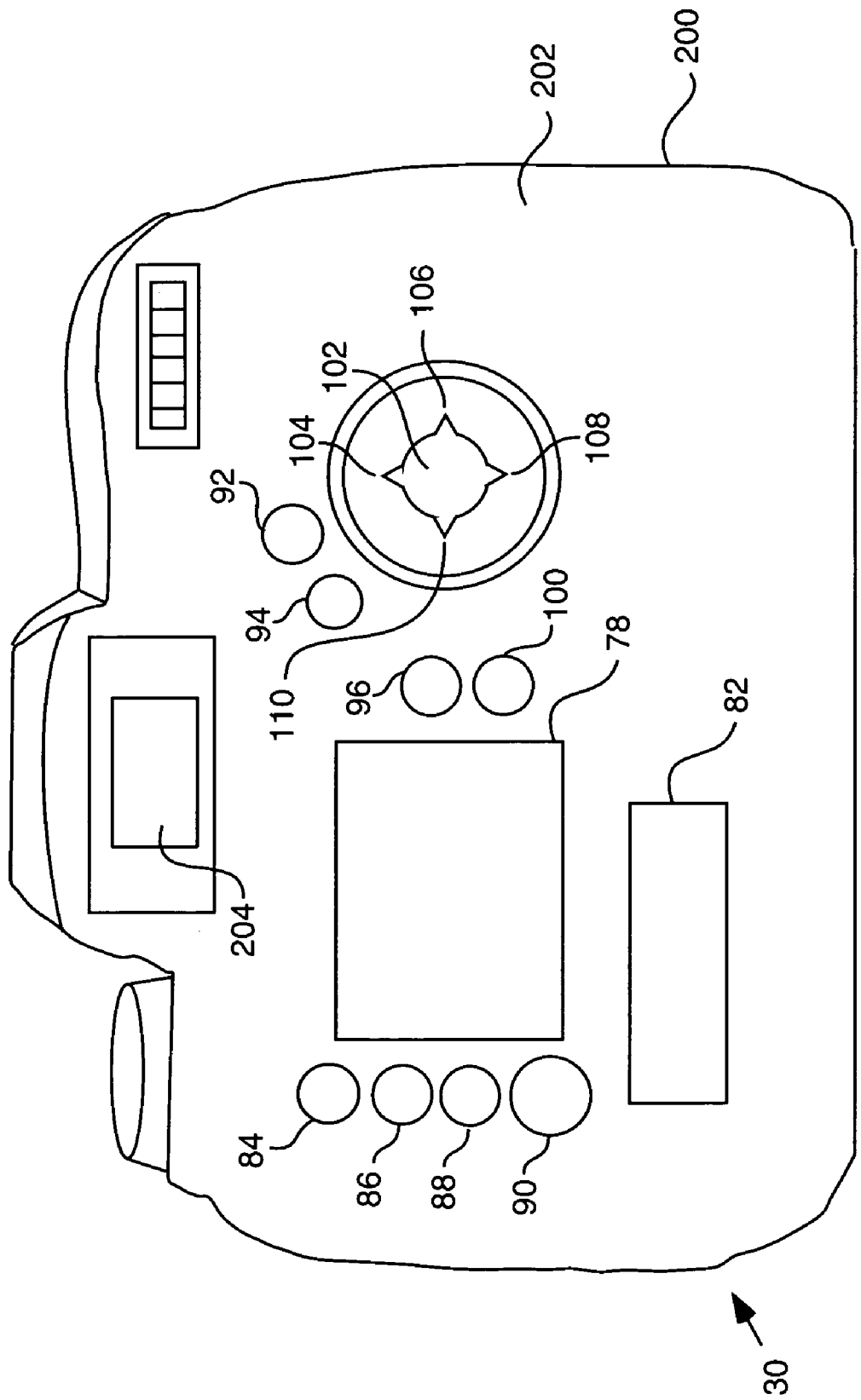
FIG. 2 is a diagrammatic view of the back panel of the camera of FIG. 1 showing first and second displays and a user interface according to the invention.

Referring now to FIG. 2 there is shown a diagrammatic view of a camera 30 showing the back panel of the camera with components of a digital user interface incorporating the present invention. As shown, digital camera 30 includes a housing 200 having a back panel 202 including image LCD 78, digital status LCD 82 and digital buttons 84-102. Back panel 202 also includes a viewfinder 204 and other camera controls (not described). Digital buttons 84-102 include menu button 84, navigate button 86, hotkey button 88, digital status button 90, OK button 92, cancel button 94, delete button 96, tag/record button 100 and 4-way switch 102 having top (12 o'clock) position 104, right side (3 o'clock) position 106, bottom (6 o'clock) position 108, and left side (9 o'clock) position 110.

Following is a more detailed description of these elements:

Image LCD-78

A color Image LCD 78 serves as the display for interfacing with the camera menu system containing features and functions (e.g., image review, setting/changing settings). The Image LCD 78 displays three classes of information images and image-related information (e.g., histogram);

camera digital feature/function menus, related sub-menus, and menu options;

text-based messages and error messages.

Digital Status LCD-82

The Digital Status LCD 82 is a programmable dot matrix display. The Digital Status LCD 82 portrays three classes of information, including:

the current status and settings that pertain to various capture-critical digital functions (icons and alphanumeric characters);

the information properties of images being reviewed on the Image LCD;

text-based messages to support and help interpret information displayed on the Image LCD;

procedural instructions.

With respect to its role in image capture, the Status LCD 82 assumes an enhanced interaction capability that will allow efficient access to these capture-related digital functions (white balance, etc).

The following describes the behavior of the digital buttons 84-102:

4-Way Switch

The 4-way switch 102 is composed of a single 4-directional rocker switch located on the back panel 202 of the camera 30. When pressed at one of the 12, 3, 6, or 9 o'clock positions 104, 106, 108, 110, the switch will result in an appropriate signal to the digital camera 30 and its associated firmware 70. The 4-way switch 102 controls different aspects of the camera depending on the state of the Image LCD 78.

4-Way Switch: LCD On

When the Image LCD 78 is on, the 4-way switch 102 is captured by the digital firmware and is used to control the information displayed on the Image LCD 78. The 4-way switch 102 operates in the following manner:

When any Display Mode is active (except when the Region of Interest (ROI) box is enabled):

pressing the right 106/left 110 side of the 4-way switch 102 results in forward/backward navigation of images;

pressing the top 104/bottom 108 of the 4-way switch 102 sequences through the four Display Modes.

When the Zoom Mode is active and the ROI box is enabled:

pressing the left 110/right 106 side of the 4-way switch 102 results in a left 110/right 106 movement of the ROI box;

pressing the top 104/bottom 108 of the 4-way switch results in a upward/downward movement of the ROI box.

When any Tabbed Menu screen or text-based menus are displayed on the LCD 102:

pressing the right 106/left 110 side of the 4-way switch 102 results in left/right navigation of menu options (e.g., Tabbed Menu screens);

when a Tabbed screen option with a cascaded menu is highlighted, pressing the right 106 side of the 4-way switch 102 enables the cascaded menu with the current value highlighted;

when an enabled cascaded menu or double-cascaded menu is displayed, pressing the left side 110 of the 4-way switch 102 disables the menu;

pressing the top 104/bottom 108 of the 4-way switch 102 results in an upward/downward navigation through vertically-arranged menu options (e.g., Tabbed Menu screen options, cascaded menu options).

The 4-way switch 102 may be used in a discrete or continuous manner. That is, images or menu options may be navigated one at a time by pressing and releasing one side of the 4-way switch 102. Alternatively, images or menu options may be navigated continuously by pressing and holding (for longer than 500 milliseconds) one side of the 4-way switch 102.

4-Way Switch 102: Digital Status Button 90 Active

When the Digital Status button 90 is pressed and held, the 4-way switch 102 is captured, taking control from either of the other camera functions (i.e., autofocus, Image Display) currently using the 4-way switch 102. When under the control of the Digital Status button 90, the 4-way switch 102 is used to sequence among the functions displayed on the Digital Status Display 82.

When the Digital Status button 90 has control of the 4-way switch 102, the switch 102 operates in the following manner:

manipulation of the right 106-left 110 sides of the 4-way switch 102 sequences among the functional groupings, with wraparound;

manipulation of the top 104-bottom 108 sides of the 4-way switch 102 sequences among the functional groupings, with wraparound.

OK Button-92

The OK button 92 is a push button located on the right side of the camera's back panel 202, just to the left of the 4-way switch 102 and above the Cancel button 94. The OK button 92 serves a number of functions:

when the image LCD 78 is off, pressing the OK button turns it on;

when a menu option is highlighted on image LCD 78, pressing the OK button 92 will implement that option;

in the Zoom Mode with the ROI box disabled, pressing the OK button 92 will enable the ROI box at the default or the last-used position;

in the Zoom Mode with the ROI box enabled, pressing the OK button will implement the zoom;

when any confirmation screen is presented on image LCD 78, pressing the OK button 92 will implement the process (i.e., Delete Image, Click Balance).

Cancel Button-94

The Cancel button 94 is a push button located on the upper right side of the camera's back panel 202, just to the left of the 4-way switch 102 and below the OK button 92. The Cancel button 94 will serve a number of functions:

when the image LCD 78 is on and any Display Mode is active, pressing the Cancel button 94 will turn the image LCD 78 off;

when the image LCD 78 is on and displaying a sub-menu, pressing the Cancel button 94 exits from that sub-menu to the parent menu in the UI hierarchy without implementing any changes;

in the Zoom mode with the ROI box enabled, pressing the Cancel button 94 will disable the ROI box;

when any confirmation screen is presented, pressing the Cancel button 94 does not implement the process (Delete Image, Click Balance);

when the Menu Bar is displayed on the image LCD 78, the Cancel button 94 will dismiss it. (The Menu Bar can also be toggled off by pressing the Menu button).

Menu Button-84

The Menu button 84 is a push button located on the left side of the camera's back panel 202, just to the left of the Image LCD 78 and above the Navigate button 86. The Menu button 84 will serve the following functions:

when the Image LCD 78 is on and any Display Mode is active, pressing the Menu button 84 will display the last-accessed Tabbed Menu screen with the last-accessed option highlighted;

when the tabbed Menu screen and its associated text-based menu is displayed on Image LCD 78, pressing the Menu button 84 will dismiss the Menu screen and display the last-used image mode;

when the Image LCD 78 is off, pressing the Menu button 84 will turn the Image LCD 78 on and display the last-accessed Tabbed Menu screen with the last-accessed option highlighted;

when a submenu option requiring an OK 92/Cancel button 94 press, the Menu Button 84 will not dismiss the Menu screen;

when any Tabbed Menu screen is displayed on Image LCD 78, pressing and holding the Menu button 84 and manipulating the right 106/left 110 side of the 4-way switch 102 navigates the tabbed screens.

Nav+ Button-86

The Nav+ button 86 allows a method of quickly and efficiently navigating among folders and images within a folder. The Nav+ button 86 is located on the left side of the Image LCD 78, below the Menu button 84. The Nav+ button 86 works in conjunction with the 4-way switch 102 to accomplish the following functions:

navigating among folders on a card;

navigating several images at a time within a folder.

When pressed, the Nav+ button 86 accomplishes the following:

if the Image LCD 78 is off, it turns the Image LCD 78 on and displays the currently active Image Mode with the Nav+ overlay.

The Nav+ overlay includes the following information:

a list of folder names that exist on the memory card together with the number of images in each folder;

a location bar that indicates the position of the current image relative to the total number of images in the folder;

the location bar will have shading to indicate the number of images in the folder relative to the maximum number of images (maximum =99);

the location bar will have tick marks every nth image;

if the Image LCD 78 is on, it displays the currently active Image Mode with the Nav+ overlay;

displays review-related information on the Digital Status display LCD 82.

Hotkey Button-88

The Hotkey button 88 is a push button located on the left side of the camera's back panel, to the left of the Image Display and below the navigate button 86. The Hotkey button 88 is used in conjunction with the 4-way switch 102 to allow quick access to user-specified functions. The Hotkey button 88 serves as a shortcut to a (user defined) frequently-changed function so that the function's current value may be changed. One or more functions can be set for use with the hotkey button.

When pressed, the Hotkey button 88 accomplishes the following:
- if the Image LCD 78 is off, it turns the Image LCD 78 on and displays the function associated with the first Hotkey position;
- if the Image LCD 78 is on, it displays the function associated with the first Hotkey position;
- when used in conjunction with the 4-way switch 102 it displays the user-selected function;
  - pressing the Hotkey button and manipulating the right side of the 4-way switch 102 sequences through the Tabbed Menu screens associated with the assigned Hotkey positions in an ascending numerical order; the Digital Status Display portrays the information associated with the highlighted menu option;
  - pressing the Hotkey button 88 and manipulating the left side of the 4-way switch 102 sequences through the assigned Hotkey positions in a descending numerical order; the Digital Status Display portrays the information associated with the highlighted menu option;
  - as each Hotkey position is selected, its associated tabbed menu screen with highlighted function is displayed with a disabled appearance. When the Hotkey button 88 is released, the Tabbed Menu screen becomes enabled;
  - only functions associated with assigned Hotkey positions are displayed (i.e., unassigned positions are ignored for display purposes).

Digital Status Button-90

The Digital Status button 90 is a push button located above the top left corner of the Digital Status display 82. This button functions to control access to capture-related functions portrayed on the Digital Status display 82.
- pressing and holding the Digital Status button 90 highlights the last-used Digital Status display 82 function, traps the 4-way switch 102, and displays the tabbed Menu screen for the highlighted function (disabled appearance) on the Image Display 78;
  - if review-related information is displayed, pressing the Digital Status button 90 displays capture-related information and highlights the icon associated with the last-accessed function highlighted;
- when the Digital Status button 90 is released, the Menu function is enabled.

Digital Status LCD-82

The Digital Status LCD 82 is a programmable display that portrays three different classes of information: (1) the current status and settings that pertain to various capture-critical digital functions, (2) the information properties of images being reviewed on the Image LCD 78, and (3) text-based messages to support and help interpret information displayed on the Image LCD 78. With respect to its role in image capture, the Digital Status LCD 82 assumes an enhanced interaction capability that will allow efficient access to these capture-related digital functions (white balance, etc.). With respect to its roles in menu screen navigation, the Digital Status LCD 82 assumes an interpretive support role (e.g., "help messages", and "tool tip messages") for the content on the Image Display 78.

Capture-Related Information: Interactive Display-Control Elements

The capture functionality of the Digital Status display 82 will be interactive in nature and will serve two functions:
- displays a set of icons associated with capture-critical functions; these icons portray the current value of each function.
- serves as a shortcut to a relevant menu option for changing the displayed value of the highlighted function.

The nature of the interaction is such that when a display element is highlighted by the user, the highlighted function on the Digital Status Display calls and portrays its associated Tabbed Menu screen function on the Image Display 78. The user may then interact directly with the Menu options associated with that function.

Figure 3:
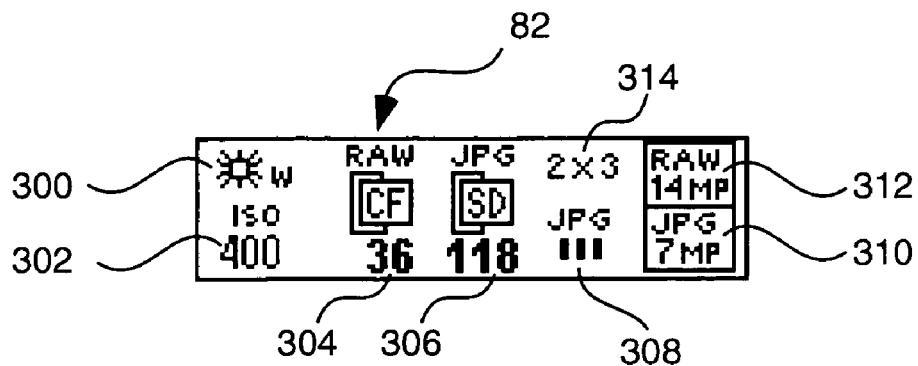

As shown in FIG. 3, Digital Status Display 82 displays icons for the following functions: white balance 300;
ISO speed 302;
CF and MM/SD memory cards 304, 306;
JPEG quality 308;
raw and JPEG resolution 310, 312; and
crop aspect ratio 314.

Figure 4:
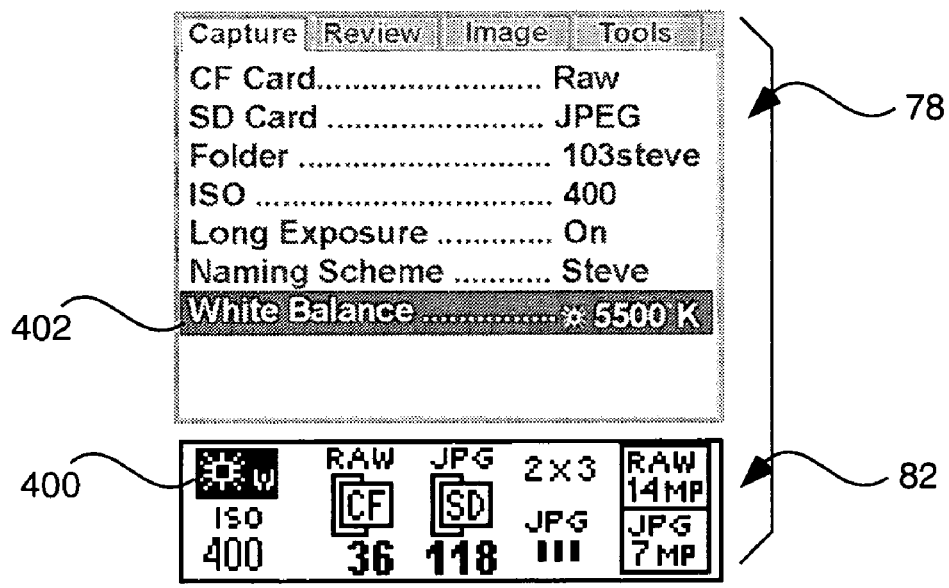

The highlighted Digital Status Display function 400 on display 82 has a corresponding menu option 402 displayed on Image Display 78 (FIG. 4).

Review Display Elements (Read Only)

The review functionality of the Digital Status Display will be non-interactive in nature and will serve a single purpose: it displays a set of image-based information that existed at the time of capture for the image.

Figure 5:
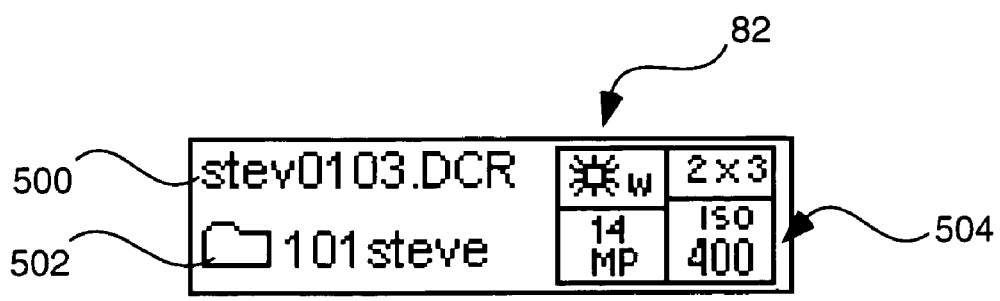

When the review-related information is displayed, the Digital Status Display reverts to the capture-related information when the shutter button is pressed to S1. In FIG. 5, current image number 500 and current folder name 502 are displayed on the left and white balance, crop aspect ratio, ISO and resolution 504 are displayed on the right of Digital Status Display 82.

Context-Sensitive Text Messages (Read Only)

The Digital Status Display 82 also provides a supporting role to the Image LCD 78. The nature of this support will be a combination of a "mini-help" and a "tool tips" function. The design intent behind this mutual display support is to provide an on-camera help system to aid the less experienced digital user.

According to the present invention there is provided a digital camera user interface having a display overlay containing spatially-distributed menu options.

Following are examples of this digital camera user interface feature.

Delete Button-96

Figure 6:
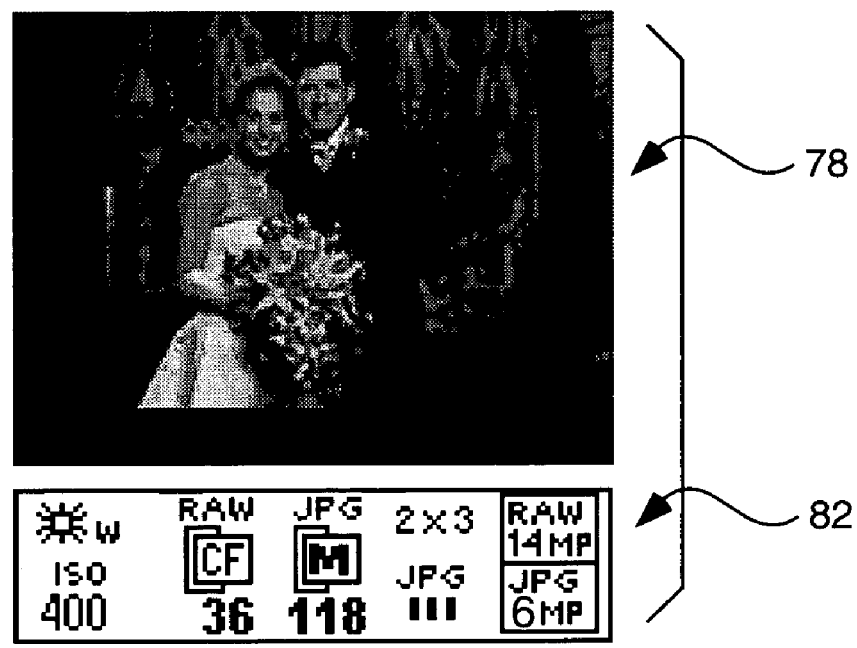

The Delete button 96 is a push button located in the center of the camera's back panel 202, to the right of the Image Display 78 and above the Tag/Record button 100. This button 96 is a dedicated Delete button 96 that when pressed will display a menu overlay over the current Image Mode content displayed with a disabled appearance. (FIG. 6 shows image display 78 displaying an image before overlay).

The Delete button 96 is enabled only when one of the image modes is active; it is disabled at all other times.

Figure 7:
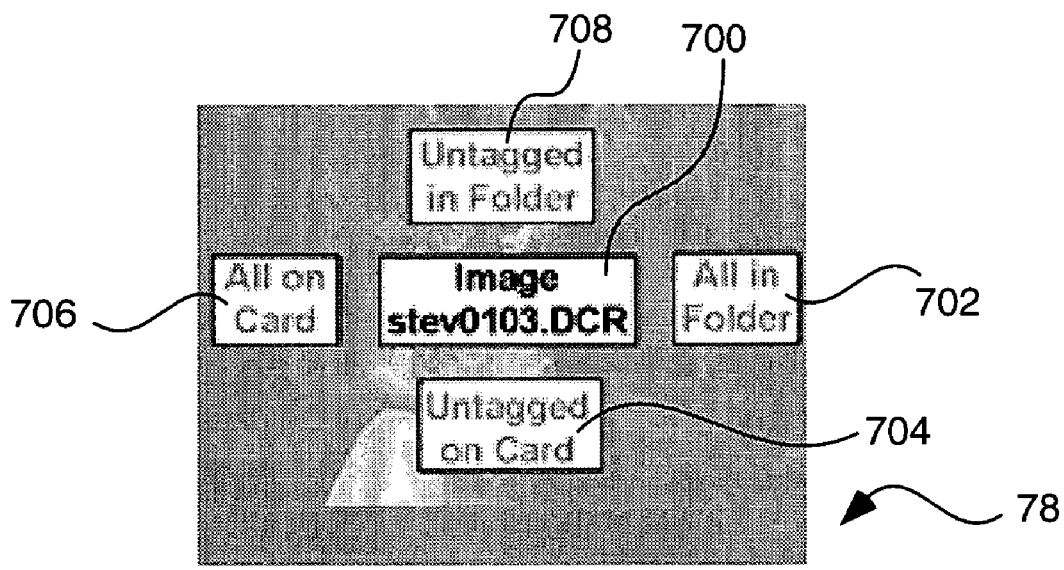
Figure 8:
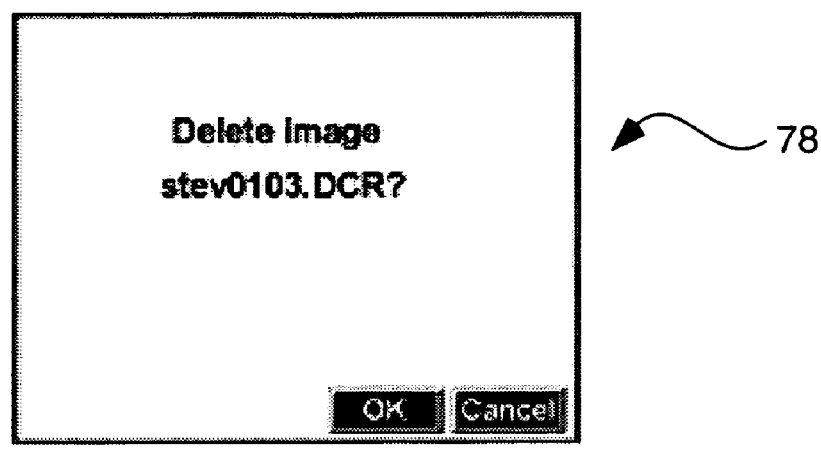

There are 5 options that are displayed when the Delete button 96 is pressed. The options are spatially arranged in an up-down and left-right pattern, with the $5^{th}$ option in the center of the screen (See: FIG. 7). The options are displayed with the center option highlighted and the other four options disabled. Accessing any of the options is accomplished by pressing any side of the 4-way switch. When accessed, a menu option is displayed with a highlighted appearance (option name in black with a red border). The five options are as follows:

700 Image <image number> This single image delete is a fixed default option that is always displayed when the Delete button is pressed.
   702 All in folder
   704 Untagged on Card
   706 All on Card
   708 Untagged in Folder When the desired option is highlighted:
   pressing OK button 92 deletes the image(s) and, depending on the highlighted function, displays a delete confirmation screen when appropriate. (See: FIG. 8).
      no confirmation screen is presented for single image deletion
      a confirmation screen is presented for functions deleting multiple images (e.g., All in Folder, Untagged on Card, etc.)
   pressing Cancel button 94 exits the delete menu and displays the previous Image Mode. (See: FIG. 6).
   Tag/Record Button-100

The Tag/Record button 100 is a push button located on the right side of the camera's back panel 202, just to the right of the Image LCD 78 and below the Delete button 96. The Tag/Record button 100 is used to tag reviewed images and to record voice/sound messages that accompany images. The Tag/Record button 100 is enabled only when one of the Image Modes is active; input from this button 100 is ignored at all other times.

Figure 9:
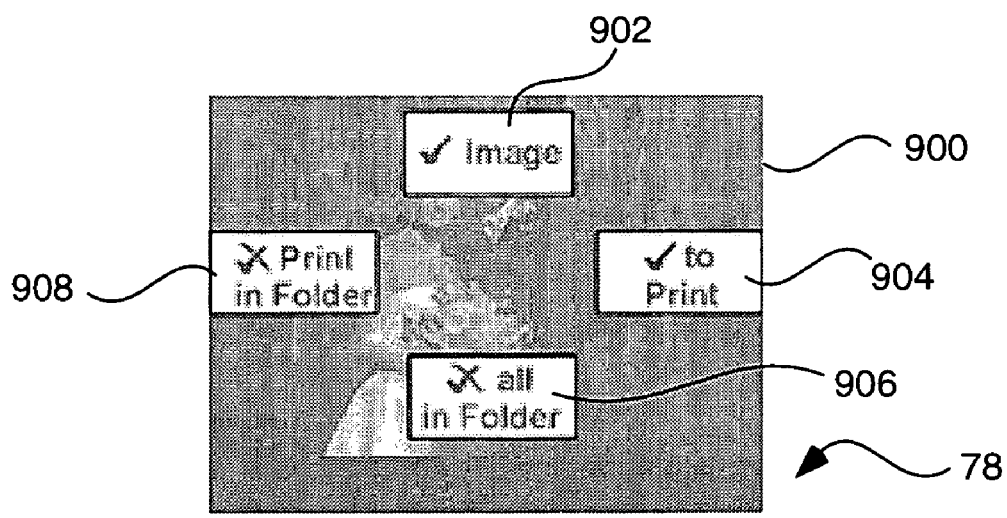

The Tag/Record button 100 is operated in two ways.
pressing and releasing the button quickly (<1 sec) displays a Tag Menu overlay 900 (See: FIG. 9) with options 902, 904, 906, 908.
pressing and holding for longer than 1 sec activates the camera's microphone
   Image Tags The Tag/Record button 100 allows a user to tag and un-tag images that are displayed and selected on the Image LCD 78. When an image is displayed on the Image LCD 78 (any Image Mode), pressing and releasing this button 100 quickly (<1 sec) displays a Tag Menu overlay. There are two classes of image tags: (1) Tag, and (2) Tag to Print.

The Digital Status Display 82 content when the Tag Menu overlay 900 is presented on image display 78 is shown in FIG. 10.

The Tag Menu overlay 900 is displayed with a disabled appearance. Manipulation of any side of the 4-way switch 102 results in highlighting the option corresponding to the switch's spatial manipulation. Releasing the 4-way switch 102 implements the function associated with that option and dismisses the Tag Menu overlay 900.
   Tags As shown in FIG. 11, pressing and holding the Tag/Record button 100 and pressing the top side 104 of the 4-way switch 102 highlights the tag Image option 902; releasing the 4-way switch 102 tags the selected image and dismisses the Tag Menu overlay 900.

When an image is tagged, a check symbol ($\sqrt{}$) 1100 is displayed on the Status Bar when that image is selected, providing the visual feedback of its tag state. In addition, the check symbol ($\sqrt{}$) 1100 is displayed in the Histogram Mode for that image (not shown).

As shown in FIG. 12, when a tagged image is displayed on image display 78 and the Tag/Record button 100 is pressed, the top option 902 is presented ($\sqrt{}$) as "untag image" 1102. In highlighting that option un-tags that image and dismisses the Tag Menu overlay 900.

Figure 13:
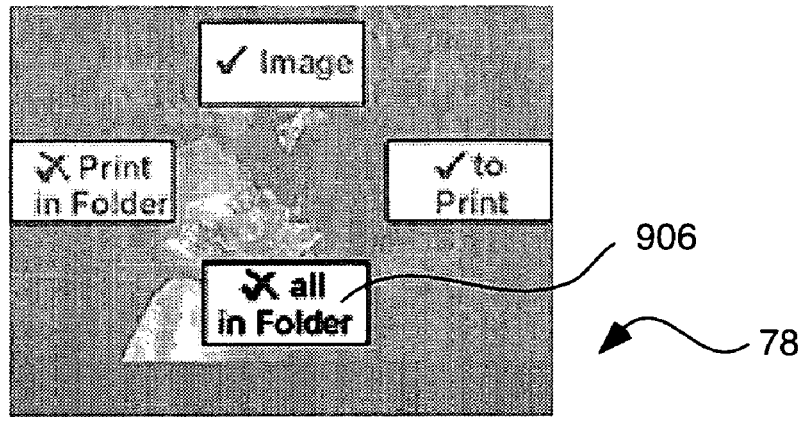
Figure 14:
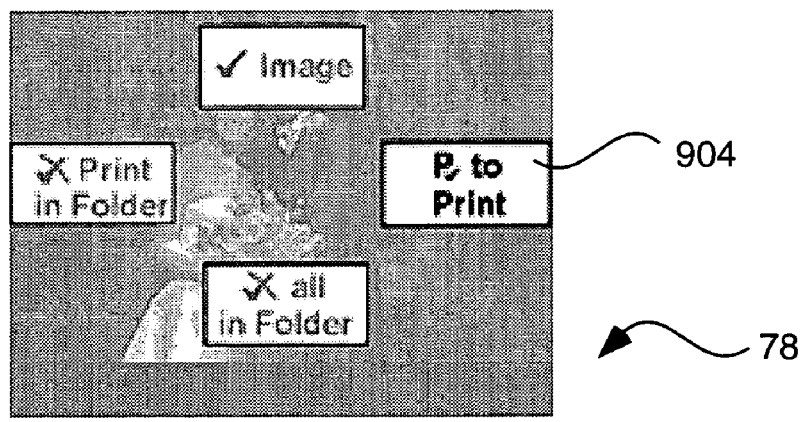

Similar tag and untag options can be used on all images in a folder by manipulating the Tag/Record button 100 and the bottom side 108 of switch 102. In such case option 906 is appropriately highlighted (FIG. 13).
   Tag to Print Camera 10 complies with Digital Print Order File (DPOF) standards for printing files from a memory card. This DPOF capability is implemented through the tag function as one of the tag classes. The DPOF function is relevant only for JPEG images. As shown in FIG. 14, pressing and holding the Tag/Record button 100 and pressing the right side 106 of the 4-way switch 102 highlights the "P$\sqrt{}$ to Print" option 904; releasing the 4-way switch 102 and displays the Print Properties sub-menu (FIG. 16).

Figure 15:
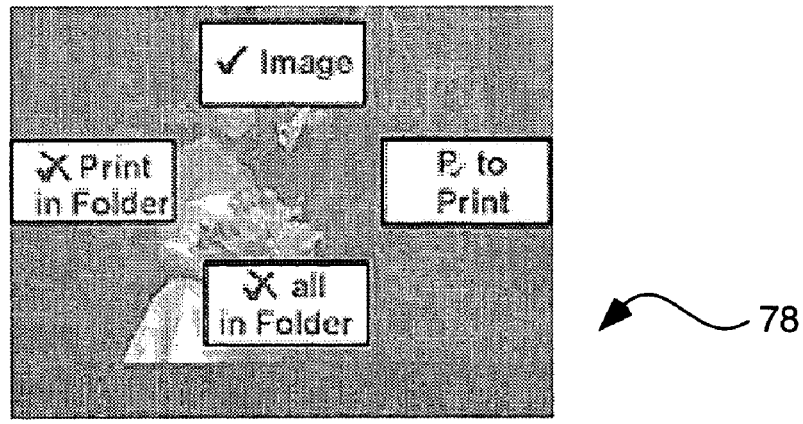

When a DCR image is selected and the Tag Menu overlay is displayed, the "P$\sqrt{}$ to Print" option 904 has a highlighted border but the text message has a disabled appearance (FIG. 15).

Figure 16:
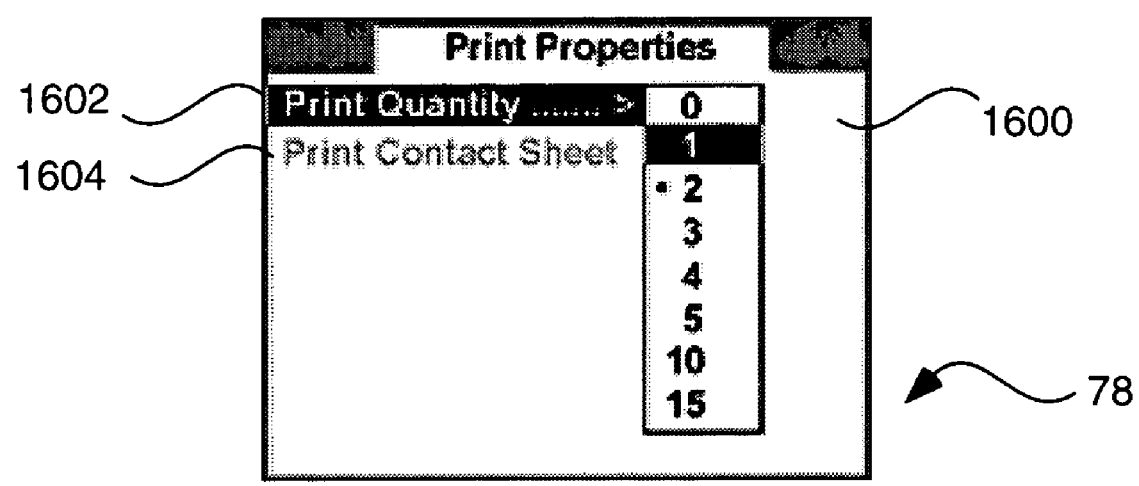

As shown in FIG. 16 the Print Properties sub-menu screen 1600 contains two options:
a Print Quantity option 1602;
an option to print a contact sheet of images in the current folder (1604)

Selecting the desired Quantity and pressing the OK button 92 dismisses the Print Properties screen and returns the user to the last-used Image Mode. Manipulation of the Tag/Record button 100 and right side 110 of switch 102 accesses the Print in Folder option 98.

The invention has been described in detail with particular reference to certain preferred embodiments thereof, but it will be understood that variations and modifications can be effected within the spirit and scope of the invention.

Parts List

| | |
|---|---|
| 30 | digital camera |
| 32 | lens |
| 33 | adjustable aperture |
| 34 | aperture driver |
| 35 | shutter motor drive |
| 36 | mechanical shutter |
| 37 | driver |
| 40 | image sensor |
| 42 | driver |
| 50 | analog Gain & CDS |
| 52 | A/D converter circuit |
| 62 | controlled interface processor |
| 64 | DRAM buffer memory |
| 66 | digital image processor |
| 68 | RAM |
| 70 | firmware memory |
| 72 | memory card interface |
| 74 | removable memory card |
| 76 | interface |
| 77 | interface cable |
| 78 | LCD |
| 80 | PC host computer |
| 82 | digital status LCD |
| 84 | menu button |
| 86 | navigate button |
| 88 | hotkey button |
| 90 | digital status button |
| 92 | OK button |
| 94 | cancel button |

-continued

| | |
|---|---|
| 96 | delete button |
| 100 | tag/record button |
| 102 | 4-way switch |
| 104 | top position of switch |
| 106 | right position of switch |
| 108 | bottom position of switch |
| 110 | left position of switch |
| 200 | housing |
| 202 | back panel |
| 300 | white balance |
| 302 | ISO speed |
| 304 | CF memory card |
| 306 | SD memory card |
| 308 | JPEG quality |
| 310 | raw resolution |
| 312 | JPEG resolution |
| 314 | crop aspect ratio |
| 400 | digital status display function |
| 402 | menu option |
| 500 | image |
| 502 | folder name |
| 504 | ISO and resolution |
| 700 | image number |
| 702 | all in folder |
| 704 | untagged on card |
| 706 | all on card |
| 708 | untagged in folder |
| 900 | tag menu |
| 902 | tag menu option |
| 904 | tag menu option |
| 906 | tag menu option |
| 908 | tag menu option |
| 1100 | check symbol |
| 1102 | untagged image |

What is claimed is:

1. A digital camera which captures digital images comprising:
   a display for displaying one or more images captured by said digital camera;
   a first user actuatable switch having a plurality of spatially arrayed actuatable positions;
   a second user actuatable switch physically separate from said first switch; and
   means for displaying a menu overlay over the one or more images displayed on said display, wherein said menu overlay displays selectable options spatially arrayed in the same pattern as said plurality of spatially arrayed actuatable positions, such that actuation of said first switch at one of said plurality of positions selects the option displayed at a like position of said menu overlay;
   wherein the menu overlay further displays an additional selectable option arranged proximate a center of said menu overlay with said spatially arrayed selectable options arranged around the additional selectable option;
   wherein actuation of the second user actuatable switch selects the additional selectable option arranged proximate the center of the menu overlay.

2. The digital camera of claim 1 wherein said first user actuatable switch is a four-way switch having left side, right side, top and bottom actuatable positions; and
   wherein said menu overlay displays said spatially arrayed selectable options in a like array having left side, right side, top and bottom options arranged to a left side, right side, top and bottom, respectively, of the additional selectable option.

3. The digital camera of claim 1 wherein said means for displaying includes another user actuatable switch which effects display of said overlay menu when actuated.

4. The digital camera of claim 1 wherein said selectable options comprise a set of image delete options including one or more of a delete single image option, a delete all images of a particular group option, and a delete all untagged images of a particular group option.

5. The digital camera of claim 4 wherein said delete options are displayed in a cross-type array.

6. The digital camera of claim 1 wherein said selectable options comprise a set of image tag options including one or more of a tag or untag single image option, a tag to print single image option, a tag or untag to print for all images of a particular group option, and a tag or untag for all images of a particular group option.

7. The digital camera of claim 6 wherein said tag options are displayed in a cross-type array.

* * * * *